United States Patent [19]
Mastronarde

[11] Patent Number: 6,055,803
[45] Date of Patent: May 2, 2000

[54] GAS TURBINE HEAT RECOVERY STEAM GENERATOR AND METHOD OF OPERATION

[75] Inventor: Thomas P. Mastronarde, South Windsor, Conn.

[73] Assignee: Combustion Engineering, Inc., Windsor, Conn.

[21] Appl. No.: 08/986,675

[22] Filed: Dec. 8, 1997

[51] Int. Cl.[7] .................................................. F02C 6/18
[52] U.S. Cl. ...................................... 60/39.02; 60/39.182
[58] Field of Search ............................. 60/39.02, 39.182, 60/39.5; 122/1 R, 1 B, 7 R, 7 B

[56] References Cited

U.S. PATENT DOCUMENTS

| | | | |
|---|---|---|---|
| 2,170,351 | 8/1939 | Junkins | 122/1 B |
| 4,054,107 | 10/1977 | Horlitz, Jr. | 122/7 B |
| 4,106,286 | 8/1978 | Sakai et al. | 60/39.5 |
| 4,466,241 | 8/1984 | Inui et al. | 60/39.182 |
| 4,572,110 | 2/1986 | Haeflich | 122/7 R |
| 4,825,638 | 5/1989 | Dutz et al. | 60/39.02 |
| 4,875,436 | 10/1989 | Smith et al. | 60/39.182 |
| 4,957,049 | 9/1990 | Strohmeyer, Jr. | 110/234 |
| 4,989,405 | 2/1991 | Duffy et al. | 60/39.182 |
| 5,461,853 | 10/1995 | Vetterick | 60/39.182 |
| 5,776,413 | 7/1998 | Kamberger et al. | 60/39.182 |

FOREIGN PATENT DOCUMENTS

| | | |
|---|---|---|
| 0 309 792 A1 | 4/1989 | European Pat. Off. . |
| 0 670 175 A1 | 9/1995 | European Pat. Off. . |
| 2 082 084 | 7/1981 | United Kingdom . |

OTHER PUBLICATIONS

Abstract of Japanese Patent, Pub. No. 03221702; Pub. Date Sep. 1991.

International Search Report for International Application No. PCT/US98/23799, International filing date: Nov. 1998.

*Primary Examiner*—Ted Kim
*Attorney, Agent, or Firm*—Alix, Yale & Ristas, LLP

[57] ABSTRACT

A heat recovery generator has a housing defining a horizontally oriented exhaust gas stream. The exhaust gas stream passes through a first heat recovery unit having horizontally oriented heat transfer tubes and forced circulation of a heat transfer fluid therethrough. The exhaust gas stream then is passed through an air pollution control assembly having a catalyst for reduction of exhaust emissions. The exhaust gas stream is subsequently passed through a second heat recovery steam generator having vertically oriented heat transfer tubes and natural circulation therethrough.

11 Claims, 3 Drawing Sheets

GAS TURBINE HEAT RECOVERY STEAM GENERATOR AND METHOD OF OPERATION

FIELD OF THE INVENTION

The present invention relates to gas turbine combined cycle systems having a heat recovery steam generator with a catalyst to reduce emission output.

BACKGROUND OF THE INVENTION

Gas turbines have been widely used to provide electric power, usually as a standby for both peak power and reserve power requirements in the utility industry. Gas turbines are preferred because of their rapid starting capability and low capital cost. Conventional gas turbines, however, operate with reduced thermal efficiency due to the high exit temperatures of the exhaust gas stream and the resulting thermal loss. Therefore, a gas turbine is often combined with a heat recovery steam generator to improve overall system efficiency.

The heat recovery steam generator can be employed to drive a steam turbine for power output, or to provide process steam in co-generation cycles. Applications requiring steam cycles above 140 bar operating pressure typically employ once-through heat recovery steam generators having a vertically oriented exhaust gas flow. In the once-through heat recovery generator having vertical exhaust gas flow, the exhaust gas stream from the gas turbine flows upward through stacked arrangements of heat recovery assemblies and air pollution control assemblies. These heat recovery assemblies employ horizontally oriented heat transfer tubes and forced circulation of the heat transfer fluid therethrough.

Fossil fuel fired combustion processes such as that employed in a gas turbine, have the potential to produce pollutants including nitrogen oxides and carbon monoxide in the exhaust gas stream. High temperature SCR (selective catalytic reduction) catalyst materials can be positioned in the exhaust gas stream of the gas turbine to reduce these undesired emission outputs. Commercially available high temperature SCR catalyst materials are generally limited to a maximum operating temperature of 565° C. Common medium temperature catalyst materials are limited to an operating temperature of 400° C. However, the temperature of exhaust gases exiting advanced technology gas turbines are typically above 620° C. Therefore, the air pollution control catalyst of the assemblies must be installed downstream from at least some of the heat transfer surface, usually between heat recovery assemblies, in order to reduce the maximum service temperatures experienced by the catalyst materials. Therefore, the catalyst reactor chamber is embedded within the heat recovery steam generation vertical exhaust gas flow path.

One type of heat recovery steam generator is vertically oriented and has a vertical exhaust gas flow. In such an arrangement, the heat transfer tubes are oriented horizontally and typically employ circulation pumps in the evaporator sections. Alternately, heat recovery steam generators can alternately employ a horizontal exhaust gas flow path. Heat recovery steam generators having horizontal exhaust gas flow employ heat recovery assemblies having vertically oriented heat transfer tubes with natural circulation of the heat transfer fluid therethrough. The natural circulation reduces or eliminates the requirements for circulation pumps. Heat recovery assemblies having vertically oriented heat transfer tubes and natural circulation of the heat transfer fluid therethrough can experience thermal shock during rapid start up particularly to the associated thick-walled pressure vessels. These thick-walled pressure vessels, i.e. drums, separate the steam and water, recirculating the water through the heat recovery assembly.

SUMMARY OF THE INVENTION

Briefly stated, the heat recovery steam generator in accordance with the invention has a generally horizontally oriented exhaust gas flow path. A housing defines the generally horizontal exhaust gas flow path through heat recovery and air pollution control assemblies. The housing has a diffuser portion mounted generally at the exhaust of the associated gas turbine and a full cross-section portion containing the heat recovery and air pollution control assemblies.

A first heat recovery assembly having a once-through section of high pressure horizontal heat transfer tubes is positioned adjacent the diffuser portion of the housing. The horizontal heat transfer tubes have forced circulation of the heat transfer fluid therethrough. An air pollution control assembly is positioned downstream from the first heat recovery assembly in the exhaust gas flow direction. The air pollution control assembly is formed of a catalyst for the reduction of CO and/or $NO_x$ emissions contained in the exhaust gas. A second heat recovery assembly is positioned downstream from the air pollution control assembly in the exhaust gas flow direction. The second heat recovery assembly is formed of generally vertically oriented heat transfer tubes and has natural circulation of the heat transfer fluid therethrough. The use of natural circulation for the second heat recovery assembly eliminates the need for circulation pumps, thereby reducing the cost for the system.

The use of once-through forced circulation (no steam drum) in the first heat recovery assembly initially contacted by the hot gas stream from the gas turbine provides rapid start up of the combined cycle system because there are no thermal stress limitations imposed by thick walled pressure vessels, i.e., drums. The drum typically associated with the second heat recovery assembly is not subjected to high thermal stress because the exhaust gas flow entering this second heat recovery assembly is at a lower temperature due to its cooling by the first heat recovery assembly. Therefore, the entire combined cycle system is capable of rapid start up due to the reduction of thermal stress limitations. The heat recovery steam generator in accordance with the invention is particularly well suited for applications having steam cycles above 140 bar operating pressure.

Furthermore, the generally vertically oriented heat transfer tubes of the second heat recovery assembly permit simplified manual washing to remove accumulated ammonia salts. The horizontal orientation of the exhaust gas flow path reduces the problem of protecting the catalyst during washing of the heat transfer tubes that can produce acids that affect the catalyst. The acids formed by the washing of the second heat recovery assembly can be easily drained from the bottom of the housing without substantial probability of the wash water contaminating the catalyst of the air pollution control assembly. The improved ability to clean the first and second heat recovery assemblies allows for improved availability of the entire combined cycle system.

Furthermore, the second heat recovery assembly can be formed of spaced apart vertical tube sections defining cavities. These cavities provide additional access for cleaning and maintenance within the second heat recovery assembly. These cavities in the second heat recovery assembly, however, do not add to the height of the entire system due to the horizontal orientation of the exhaust gas flow path. In addition, the weight of the first heat recovery assembly, the air pollution control assembly and second heat recovery assembly are oriented along a horizontal path. The horizontal arrangement results in less structure being required to support the complete heat recovery steam generator.

DESCRIPTION OF THE PREFERRED EMBODIMENT

Figure 1:
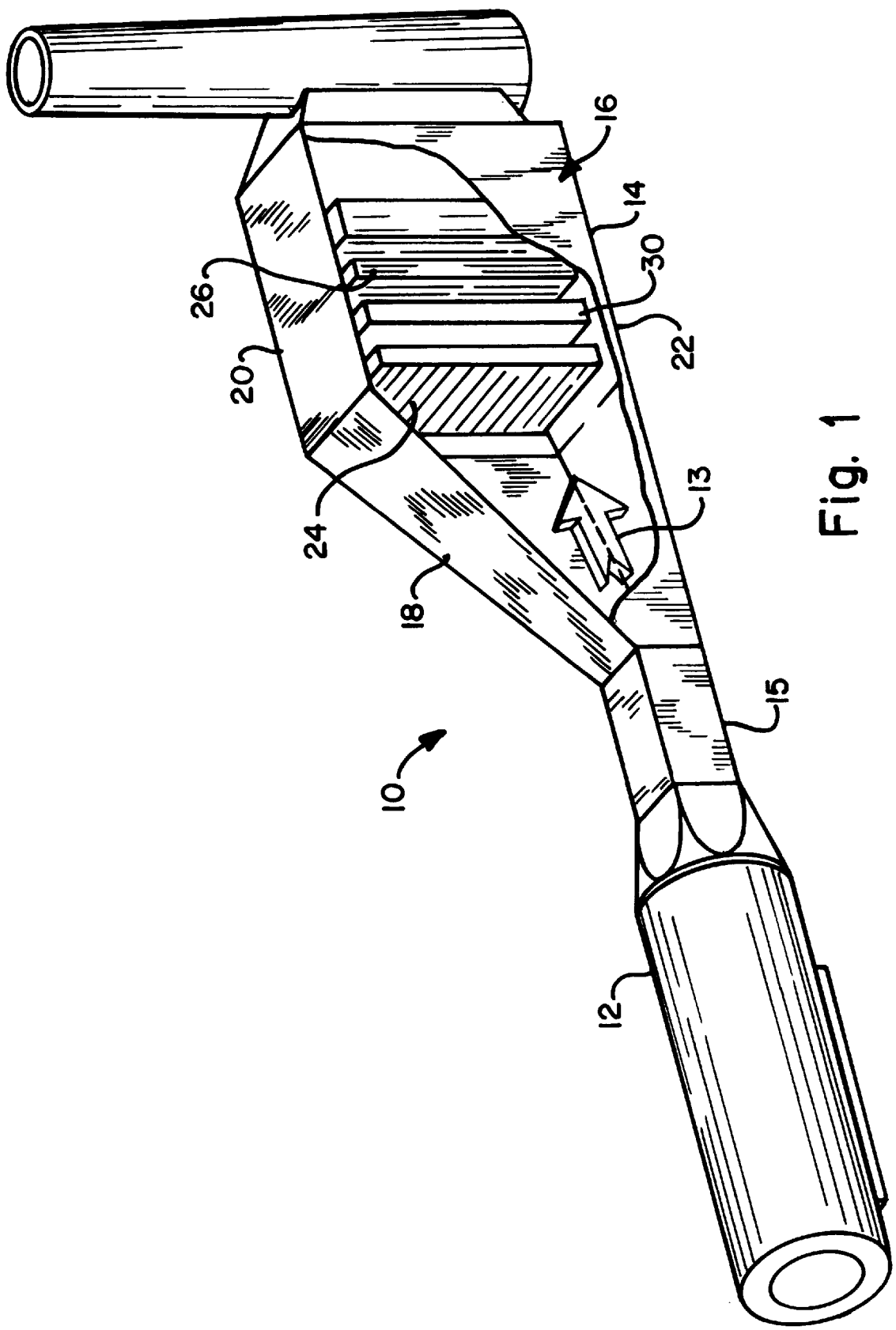
FIG. 1 is a perspective view, partially cut away, of a gas turbine in combination with a heat recovery steam generator 14 in accordance with the invention.
Figure 2:
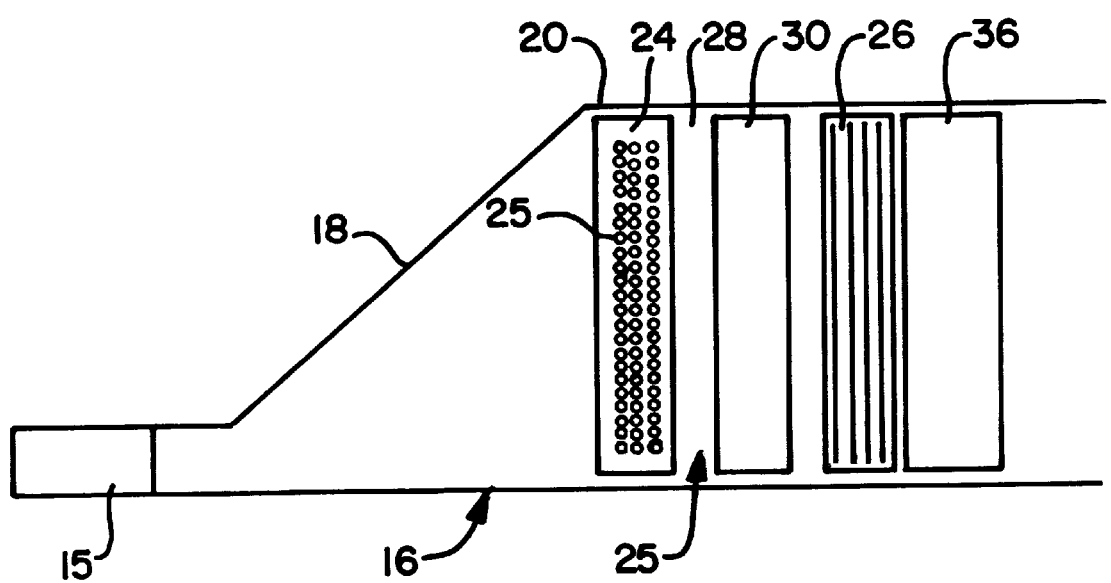
FIG. 2 is a diagrammatic representation of the cross section of the heat recovery steam generator of FIG. 1.
Figure 3:
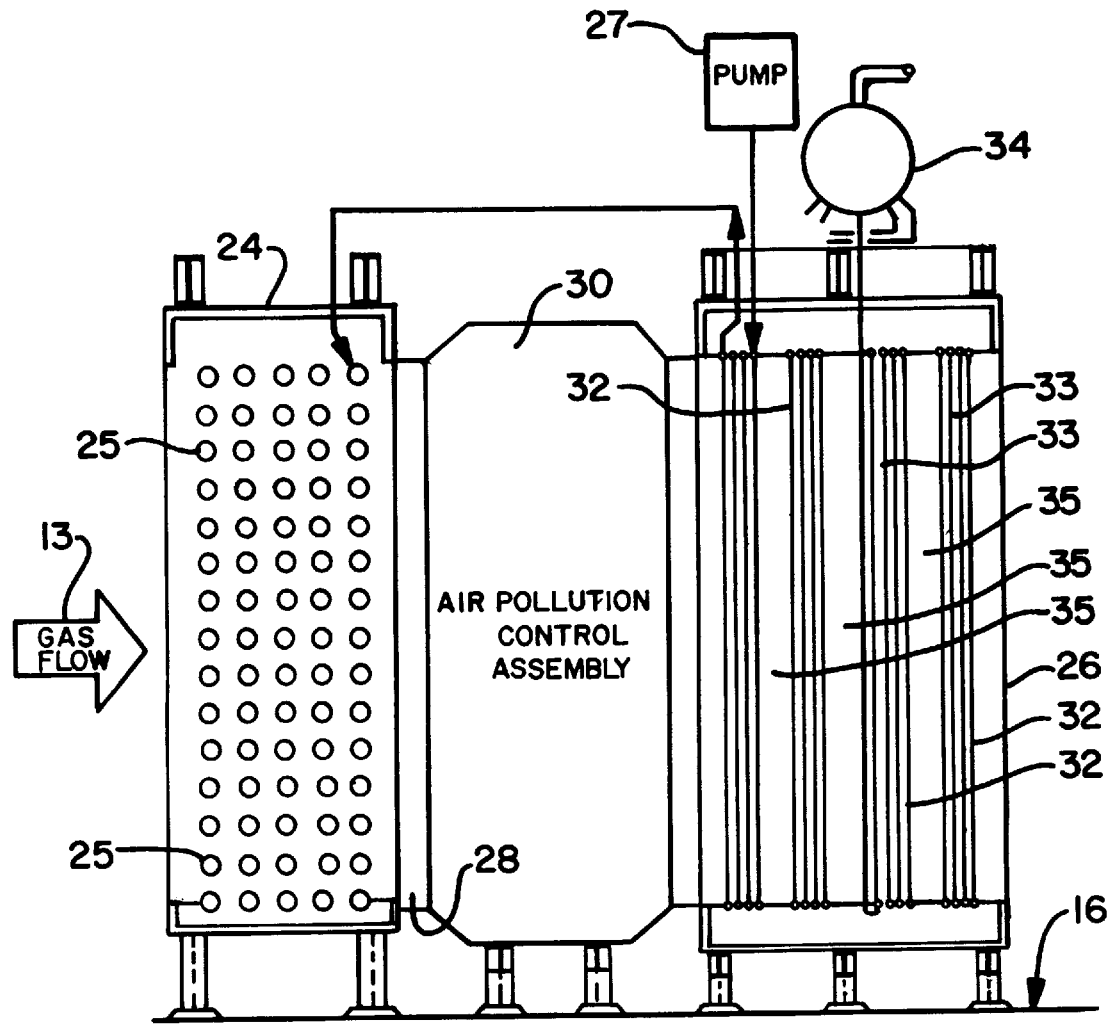
FIG. 3 is an enlarged, partially diagrammatic, cut away partial side view of the heat recovery steam generator of FIG. 1.

With reference to FIG. 1, a gas turbine combined cycle system having a gas turbine 12 with a heat recovery steam generator 14 in accordance with the invention is generally designated by the numeral 10. The gas turbine 12 discharges an exhaust gas stream 13 into the heat recovery steam generator 14 through a duct 15. The gas turbine 12 typically has exit gas temperatures above 620° C. (1150° F.), therefore allowing for considerable energy to be absorbed in the heat recovery steam generator 14. The steam resulting from operation of the heat recovery steam generator 14 can be employed to drive an electric generator via a steam turbine (not shown) or can be employed as process steam.

The heat recovery steam generator 14 has a housing 16 having a diffuser or an inlet transition portion 18, and an adjacent full cross-section portion 20. The housing 16 defines a generally horizontal exhaust gas path for the exhaust gas stream 13. The hot exhaust gas stream 13 from the gas turbine 12 is directed by the duct 15 to the inlet transition portion 18 where the exhaust gas flow is expanded from the duct 15 to the area of the full cross-section portion 20. Conventional supplemental firing systems can be readily employed with the heat recovery steam generator 14 to operate using at least a portion of the excess air in the exhaust gas from the gas turbine 12. Conventional duct burners and/or flow control devices (not shown) can be positioned in the inlet transition portion 18.

A heat recovery and pollution control assembly 22 for the recovery of thermal energy from the exhaust gas stream is positioned within the full cross section portion 20. The heat recovery and pollution control assembly 22 is comprised of a first heat recovery assembly 24 and a spaced apart second heat recovery assembly 26. The second heat recovery assembly is positioned in the downstream direction of the exhaust gas stream 13 from the first heat recovery assembly. The first and second heat recovery assemblies 24, 26 define a cavity 28 therebetween for receiving an air pollution control assembly 30. The first heat recovery assembly 24, second heat recovery assembly 26 and air pollution control assembly 30 are positioned across or transverse to the exhaust gas stream 13.

The first heat recovery assembly 24 is formed of once-through forced circulation high pressure horizontally-oriented heat transfer tubes 25. The heat transfer tubes 25 are preferably supported from the top. A pump 27 forcibly circulates a heat transfer fluid, typically water, through the heat recovery assembly 24 once, or without recirculation. The use of forced circulation for once-through flow of the heat transfer fluid in the first heat recovery section 24 allows for rapid start up of the heat recovery steam generator 14. The use of the forced circulation through the horizontally oriented heat transfer tubes 25 avoids the thermal stress limitations imposed by the use of thick-walled pressure vessels, for example drums, of alternative heat recovery assemblies.

The second heat recovery assembly 26 is formed of low pressure conventional natural circulation or thermal circulation tube sections 32 having vertically oriented heat transfer tubes 33. The vertical tube sections 32 are preferably supported from the top. The second heat transfer assembly 26 further has an associated drum 34 for separating steam and water. The vertical natural circulation tube sections 32 preferably define cavities 35 therebetween to allow access for maintenance and cleaning.

The air pollution control assembly 30 has a CO catalyst and/or an $NO_x$ catalyst in a selective catalytic reduction system. The air pollution control assembly 30 is positioned in the cavity 28 between the first and second heat transfer elements 24, 26. The horizontal orientation of the exhaust gas stream 13 reduces the difficulty of protecting the catalyst of the air pollution reduction assembly 30 during washing, particularly of the heat recovery assembly 26. The vertical tube sections 32 of the second heat recovery assembly 26 allow for simplified washing to remove ammonia salts that collect during operation of the heat recovery steam generator 14. The wash water from the second heat recovery assembly 26 can be easily drained from the bottom of the housing 16 without contamination of the catalyst in the air pollution control assembly 30.

The heat recovery and air pollution control assembly 22 further preferably employs a third heat recovery assembly 36 downstream from both the first and second heat recovery assemblies 24, 26 and the air pollution control assembly 30. The third heat recovery assembly 36 is preferably formed of a forced circulation low pressure once-through economizer having vertically oriented tubes.

The horizontal flow of the exhaust gas stream 13 also reduces the structure required to support the air pollution control assembly 30, and first and second heat recovery assemblies 24, 26 compared to the structure that would typically be required for a vertically oriented heat recovery steam generator. The reduction in height and weight of materials as a result of the horizontal flow of the heat recovery steam generator 14 can result in lower capital cost compared to current vertical flow once-through heat recovery steam generators having catalysts for pollution reduction. Furthermore, there is an increased availability of the heat recovery steam generator 14 compared to conventional heat recovery steam generators as a result of the improved cleanability of the second heat recovery assembly 26 for removal of fouling, such as ammonia salts, downstream of the catalyst.

While a preferred embodiment of the present invention has been illustrated and described in detail, it should be readily appreciated that many modifications and changes thereto are within the ability of those of ordinary skill in the art. Therefore, the appended claims are intended to cover any and all of such modifications which fall within the true spirit and scope of the invention.

What is claimed is:

1. A heat recovery steam generator for use with the exhaust of a gas turbine comprising:

a housing for receiving the exhaust of a gas turbine defining a generally horizontal exhaust flow path therethrough having an upstream direction and a downstream direction;

a first heat recovery assembly in said housing and oriented across said exhaust flow path having generally horizontally oriented first heat transfer tubes and forced once-through circulation of a heat transfer fluid;

an air pollution control assembly in said housing, oriented across said exhaust flow path and in the downstream direction from said first heat recovery unit, said air pollution control assembly comprising a catalyst for the reduction of exhaust emissions;

a second heat recovery assembly in said housing, oriented across said exhaust flow path and in the downstream direction from said air pollution control assembly, having generally vertically oriented second heat transfer tubes for natural circulation of a heat transfer fluid.

2. The heat recovery steam generator of claim 1 wherein said second heat recovery assembly comprises a plurality of spaced apart tube sections each having a plurality of said second heat transfer tubes, said tube sections defining vertically oriented cavities therebetween.

3. The heat recovery steam generator of claim 1 further comprising a third heat recovery assembly in said housing, across said exhaust gas flow path, downstream from said second heat recovery assembly, and comprising an economizer with vertically oriented heat transfer tubes.

4. The heat recovery steam generator of claim 3 wherein said second heat recovery assembly comprises a plurality of spaced apart tube sections each having a plurality of said second heat transfer tubes, said tube sections defining vertically oriented cavities therebetween.

5. The heat recovery steam generator of claim 1 wherein said second heat recovery assembly further comprises a drum for separation of steam and water.

6. A method of operating a gas turbine combined cycle system wherein the gas turbine combined cycle system comprises a gas turbine and a heat recovery steam generator having a first heat transfer assembly, a second heat transfer assembly, and an air pollution control assembly having a catalyst, the method comprising the steps of:

generating an exhaust gas stream from said gas turbine;

circulating by force a heat transfer fluid generally horizontally through said first heat transfer assembly;

circulating by natural means a heat transfer fluid generally vertically through said second heat transfer assembly;

performing a first cooling of said exhaust stream by passing said exhaust stream through said first heat transfer assembly;

after said first cooling reducing said exhaust emissions by passing said cooled exhaust stream through said air pollution control assembly; and performing a second cooling of said exhaust stream after said exhaust emissions reduction by passing said exhaust stream through said second heat transfer assembly.

7. A combined cycle system comprising: a gas turbine for generating an exhaust gas stream; and a heat recovery steam generator for recovery heat from the exhaust gas stream comprising a housing for receiving the exhaust gas stream and defining a generally horizontal exhaust flow path from said gas turbine therethrough, said exhaust gas flow path having an upstream direction and a downstream direction, a first heat recovery assembly in said housing and oriented across said exhaust flow path having generally horizontally oriented first heat transfer tubes and forced once-through circulation of a heat transfer fluid, an air pollution control assembly in said housing, oriented across said exhaust flow path and in the downstream direction from said first heat recovery unit, said air pollution control assembly comprising a catalyst for the reduction of exhaust emissions, and a second heat recovery assembly in said housing, oriented across said exhaust flow path and in the downstream direction from said air pollution control assembly and having generally vertically oriented second heat transfer tubes for natural circulation of a heat transfer fluid.

8. The combined cycle system of claim 7 wherein said second heat recovery assembly comprises a plurality of spaced apart tube sections each having a plurality of said second heat transfer tubes, said tube sections defining vertically oriented cavities therebetween.

9. The combined cycle system of claim 7 further comprising a third heat recovery assembly in said housing, across said exhaust gas flow path, downstream from said second heat recovery assembly, and comprising an economizer with vertically oriented heat transfer tubes.

10. The combined cycle system of claim 9 wherein said second heat recovery assembly comprises a plurality of spaced apart tube sections each having a plurality of said second heat transfer tubes, said tube sections defining vertically oriented cavities therebetween.

11. The combined cycle system of claim 7 wherein said second heat recovery assembly further comprises a drum for separation of steam and water.

\* \* \* \* \*